Dec. 13, 1955  M. JEANSON  2,726,739
PNEUMATIC VEHICLE-BRAKE APPARATUS
Filed Dec. 8, 1949  2 Sheets-Sheet 1

Inventor
Marcel Jeanson
By Shoemaker & Mattare
Attorneys

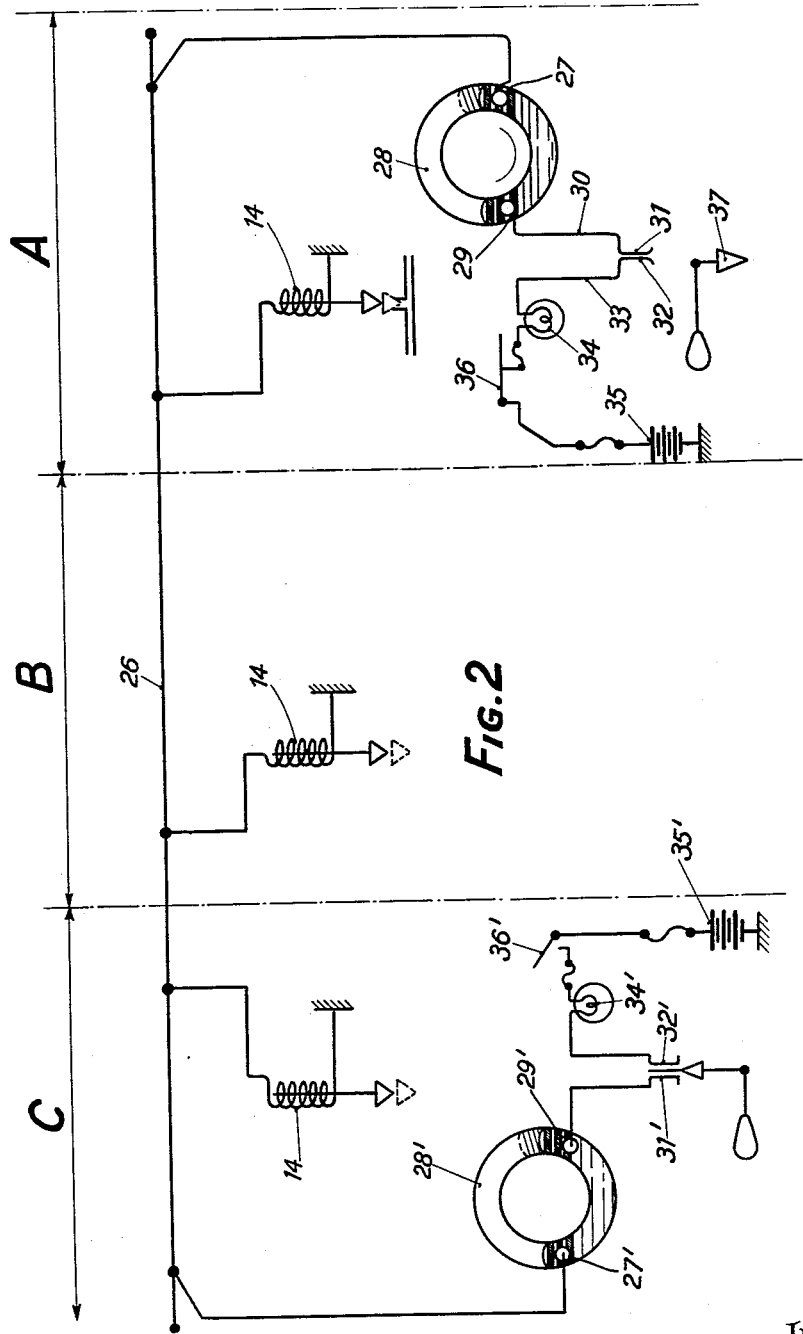

United States Patent Office 2,726,739
Patented Dec. 13, 1955

2,726,739

PNEUMATIC VEHICLE-BRAKE APPARATUS

Marcel Jeanson, Paris, France, assignor to Regie Autonome des Transports Parisiens, Paris, France, a body corporate of France Application December 8, 1949, Serial No. 131,823

Claims priority, application France December 23, 1948

4 Claims. (Cl. 188—181)

The present invention relates to pneumatic brake systems for vehicles, or of trains of vehicles: the invention consists of an improved deceleration responsive device for the partial release of the brakes when required by the working conditions.

Devices for the partial release of pneumatic brakes have already been constructed, comprising two deceleration responsive devices, one of which is adapted to act on an electromagnetically actuated brake-applying valve controlling the supply of air to the brake cylinder or cylinders, and the other of which is adapted to act on the brake-release relay-valve which can place the brake cylinder or cylinders in communication with the atmosphere when the pressure in said cylinders reaches a predetermined value.

In such a device, the first deceleration responsive device is calibrated for a deceleration of $\gamma 1$, and the second deceleration responsive device for a deceleration of $\gamma 2$ which differs from the deceleration $\gamma 1$ by about 20 cm. per sec. per sec., since in such a device it is necessary for the two deceleration responsive devices to act not simultaneously but successively.

On a vehicle provided with such a device, when the driver applies the brakes, he can, by means of the driver's valve, produce the desired pressure in the brake cylinder. But if that pressure becomes such that the deceleration of the vehicle reaches the value $\gamma 1$, the first deceleration responsive device acts on the electromagnetically operated brake-applying valve and prevents any increase of pressure in the brake cylinder. Then, if, even with a constant pressure in the brake cylinder, the deceleration continues to increase owing to the increase of the coefficient of friction of the brake-shoes at low speed, the braking force may become too great and cause the wheels to lock. If such further slowing down of the vehicle occurs, the deceleration may reach the value $\gamma 2$ for which the second deceleration responsive device is calibrated. The brake-release relay valve controlled by the second deceleration responsive device then becomes operative and causes a partial exhausting of the brake cylinder, thereby decreasing the braking force and consequently preventing possible locking of the wheels.

In such a system the deceleration is therefore controlled, during a portion of the braking operation, by the first deceleration responsive device at a value $\gamma 1$, and during another portion of the braking operation at a deceleration between $\gamma 1$ and $\gamma 2$, if the brake-shoes have a coefficient of friction which increases when the speed of the train decreases.

If, on the other hand, the brake-shoes are such that their coefficient of friction remains constant or even decreases when the speed of the train decreases (as in the case of wooden shoes impregnated with oil, for example), the deceleration will always remain limited by the first deceleration responsive device only, at a value $\gamma 1$ which is lower by 20 cm. per sec. per sec. than $\gamma 2$, which in turn corresponds to the limit of adhesion of the vehicle wheels. Therefore, in this latter case, the second deceleration responsive device never becomes operative and the deceleration is always limited to a value which is lower by 20 cm. per sec. per sec. than the maximum deceleration compatible with the limit of adhesion of the vehicle wheels.

The devices described above have been used heretofore solely in electro-pneumatic brakes, i. e. brakes normally actuated by electrical and pneumatic means.

The present invention provides for fitting a brake-release device to pneumatic brake systems such as the standard "Westinghouse" brake or any purely pneumatic brake, such as the equalizing discharge brake for example.

Another object of the invention is to provide an improved operative combination between brake-releasing means governed by the rate of deceleration of the vehicle, and any pneumatic vehicle-brake apparatus.

According to the invention, the brake-release device comprises a quick-exhaust member adapted to place the brake cylinder in direct communication with the atmosphere, and actuated by a single control member which becomes operative for a deceleration corresponding to the limit of wheel adhesion of the vehicle provided with the braking equipment.

It can therefore be seen that the brake-release device according to the present invention differs from those hereinbefore considered, on the one hand by the kind of brake with which it is associated, and to no less a degree by the fact that it is provided with a single deceleration responsive device.

In addition to the considerable simplification provided by the use of this single deceleration responsive device, the invention furthermore makes it possible, with an adjustment to the limit of adhesion of the vehicle wheels, to obtain the maximum deceleration without locking the wheels, irrespective of the type of brake-shoe used.

It should be noted that the word "vehicle" which has been used hereinbefore and which will continue to be used hereinafter, is intended to denote both a single vehicle and a multiple unit or train of vehicles coupled to one another and including one or more motor coaches, as is the case in urban or suburban railways.

Other features and particular advantages of the invention will become apparent on reading the ensuing description and from the accompanying drawings, in which:

Fig. 2 shows the electric actuating equipment of a brake system or installation according to the present invention.

Figure 1:
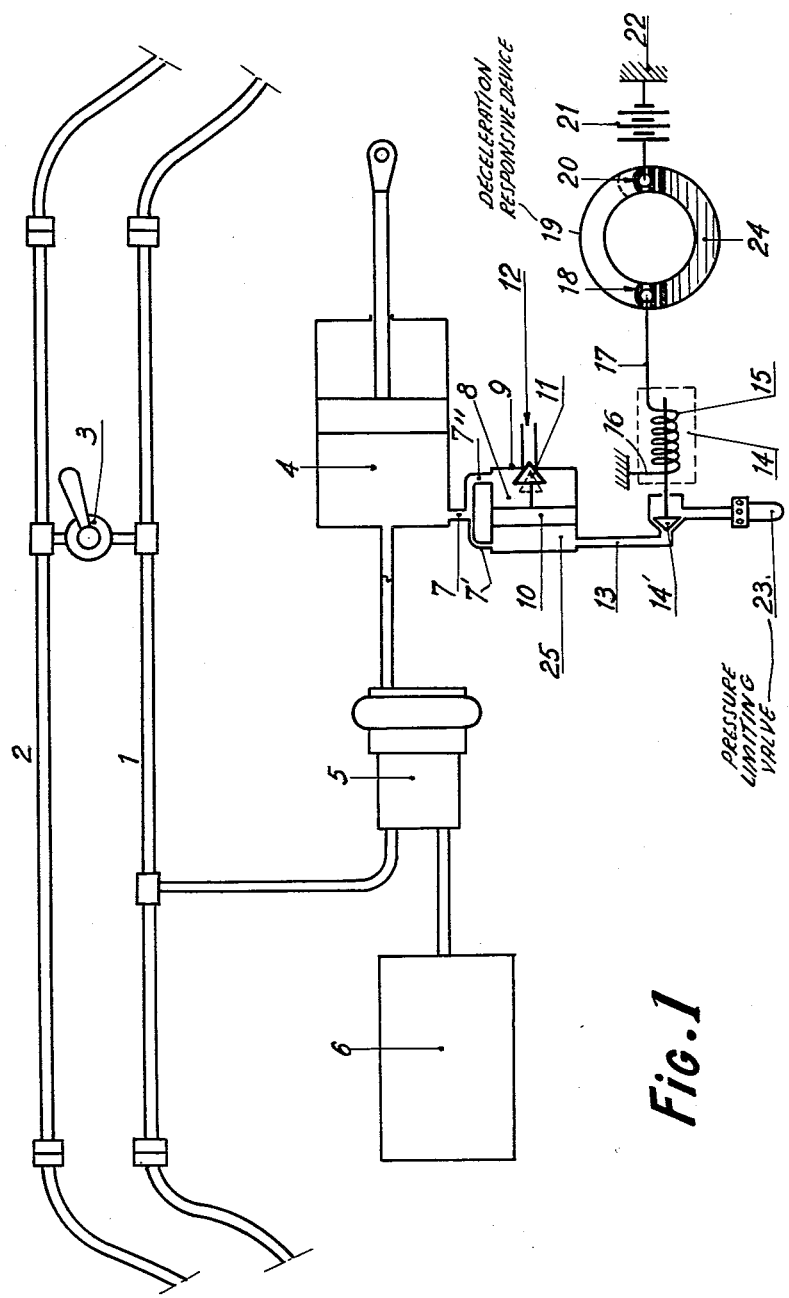
Fig. 1 shows diagrammatically a brake cylinder and its associated members.

By way of example and without its being in any way of a limitative nature, it has been assumed in the present specification that the pneumatic brake with which the partial brake-release device according to the invention is associated, has a train pipe 1 and a balancing pipe 2, which are controlled by a driver's valve 3.

With each brake cylinder 4, there is associated a triple valve 5 and an auxiliary reservoir 6. The brake cylinder is connected through a pipe 7 to a brake-release relay valve 8. The pipe 7 is subdivided into two branches 7' and 7" leading respectively into the two ends of the cylinder 9 of the brake-release relay valve. In this cylinder 9 there is adapted to move a piston 10 which carries a valve 11 normally closing an exhaust port 12 at one end of the cylinder.

The end of the cylinder 9 opposite to that provided with the port 12 opening into the atmosphere, is connected by a pipe 13 to the cone or plug member 14' of an electromagnetically actuated brake-release valve 14, the exciting solenoid of which is shown diagrammatically at 15. One of the terminals of this solenoid is grounded at 16, and the other terminal is connected by a conductor 17 to the pole 18 of a deceleration responsive device 19.

of the mercury pendulum type for example. The second pole 20 of the deceleration responsive device is connected to one of the terminals of a source of current 21, the other terminal of which is grounded at 22. The arrangement may be such that the valve 14 is opened by excitation of the solenoid 15 or by interruption of the current therein, this latter being assumed as the mode of operation in the present instance.

When open, the valve 14 allows the pressure in the pipe 13 to pass into a brake-release limiting valve shown diagrammatically at 23. This valve is calibrated for a pressure which corresponds to the limiting force required for locking the wheels of the empty vehicle.

The deceleration responsive device 19 comprises an annular tube, partly filled with mercury as indicated at 24, having an inert gas such as nitrogen filling the space above the mercury; the tube is provided with two electric contacts forming the poles 18, 20 on its periphery, the plane of the annular tube being set parallel to the direction of travel of the vehicle. The amount of mercury in the tube and the positions of the two poles or contacts 18, 20 are such that the mercury 24 which it contains connects the poles 18 and 20 electrically to one another only so long as the deceleration remains below the limiting value for the adhesion of the vehicle wheels to the rails (in the case of a railway vehicle).

When the mercury rises in the front side of the tube, as indicated by the dotted meniscus above the contact 20, from the effect of inertia when the vehicle is decelerated, the circuit from the source 21 through the solenoid 15 is broken, this taking place at the time of braking for a precise value of the deceleration of the vehicle, corresponding to the limiting value for the adhesion of the vehicle wheels.

The equipment which has just been described operates as follows: if, by actuating the valve 3, the driver causes the brakes to be applied, the pressure increases in the cylinder 4 and the brakes are applied, causing the vehicle to slow down. If the corresponding deceleration is less than that for which the deceleration responsive device 19 is calibrated, the solenoid 15 is excited, the electromagnetically actuated valve 14 is closed, and the pressure in the cylinder 4 remains under the driver's control. If, on the other hand, the deceleration reaches the limit of adhesion, the solenoid 15 is no longer excited, the electromagnetically actuated valve member 14' is lifted from its seat, thereby opening the pipe 13 and producing a fall of pressure in the portion 25 of the cylinder 9. The piston 10 then moves towards the left (as viewed in Fig. 1) and the valve 11 opens the port 12 to the atmosphere. The brake cylinder 4 is thus placed in direct communication with the atmosphere through the pipes 7', 7". Since the pressure decreases in the cylinder 4, the braking force likewise decreases and there is no danger of the vehicle wheels becoming locked.

But the pressure drop in the brake cylinder 4 is limited by the brake-release limiting valve 23 at the end of the pipe 13 to a minimum pressure which corresponds to the limit of adhesion of the wheels of the unloaded vehicle or empty train. Owing to this fact, security of the braking operation is retained without any risk of locking the wheels. Regulation of the braking force during the slowing down of the vehicle is therefore effected by one or by several successive falls of pressure of the air in the brake cylinder 4, from a limiting high pressure which causes the valve 14 to be opened by the deceleration responsive device 19, down to a minimum pressure determined by the brake-release limiting valve 23. In fact, the pressure in the brake cylinder 4, which is replenished after each partial release of the brakes through the triple valve 5 by air from the auxiliary reservoir 6, is finally stabilized at a value just below that which would cause the valve 14 to be opened by the action of the deceleration responsive device 19, i. e. at a value that corresponds to the limit of adhesion of the vehicle-wheels to the rails irrespective of the loading of the train and the type of brake-shoes used.

The diagram of Fig. 2 illustrates broadly the electrical equipment of a train of three coaches provided with a brake-release device according to the present invention. This train comprises a front coach A, an intermediate coach B, and a rear coach C. Each of the coaches is provided with an electromagnetically actuated brake-release valve 14 which has been shown isolated in Fig. 2, the remainder of the brake-release device controlling the brake cylinder of each coach being similar to that of Fig. 1. The excitation of these electromagnetically actuated valves is obtained by means of a line 26 extending along the train, this line being connected to the pole 27 of the deceleration responsive device 28 which is adjusted as hereinbefore described.

The second pole 29 of the deceleration responsive device 28 is connected by a conductor 30 to a contact 31 resiliently held against a contact 32 which is connected by a conductor 33 and a tell-tale lamp 34 to the source of current 35; a switch 36 is adapted to disconnect the entire deceleration responsive installation on the coach.

If it is desired to enable this train to move in both directions, and to be driven from either end at will, it is necessary furthermore to provide the driver's brake controls at the other end of the vehicle with a second deceleration responsive device 28' arranged symmetrically with respect to the first, and also the elements associated with that deceleration responsive device. According to the direction of movement, one or other of the deceleration responsive devices will control the braking of the whole of the train in a manner which is obvious from Fig. 2. It can be seen in this figure that the contacts 31 and 32 which, as hereinbefore stated, tend to press resiliently against one another, can be moved apart by means of the isolating cock 37 of the driver's valve, which separate the contacts 31 and 32 as shown at 31' and 32'. The deceleration responsive device 28' corresponding to these contacts is thus rendered inoperative and only the other deceleration responsive device 28 is operative.

The above described example is only of indicative value and is not in any way intended to restrict the scope of the present invention. The pneumatic brake system to which the brake-release device in question can be fitted may be of any type and in particular of variable intensity and self-charging type, thereby enabling a pneumatic braking to be obtained with all the requisite properties for modern brakes, viz. inexhaustability, controllability at application and at release, intensity proportional to the loading, and so forth.

It should be noted that the brake-release device according to the invention has two essential advantages: it procures effective protection from locking the vehicle-wheels, which is immediately apparent from its manner of operation; furthermore, it ensures optimum braking irrespective of the loading of the train and the variation of the coefficient of friction of the brake-shoes proportionally to the speed. This latter result has not been obtained heretofore, in particular in the case of the devices referred to at the beginning of the present specification.

What I claim is:

1. In pneumatic vehicle-brake apparatus, having a brake cylinder, a reservoir of compressed air, and a pneumatically operated valve for supplying air from said reservoir to said cylinder, a relay valve means for partial release of the vehicle brakes to prevent locking of the vehicle wheels, comprising a piston, a cylinder enclosing said piston and having both ends connected to the head end of said brake cylinder, an opening to atmosphere at one end of said piston-enclosing cylinder, a valve carried by said piston and adapted to seal said opening, a pipe connected to the other end of said piston-enclosing cylinder, and a valve normally sealing said pipe, in combination with a single device responsive to deceleration of the vehicle, an electric circuit operatively connected with said deceleration responsive device, said circuit controlling said pipe-sealing valve to open said pipe when the deceleration of the vehicle reaches the limit of its wheel adhesion, and means for limiting the resultant fall of pressure in said brake cylinder.

2. In pneumatic vehicle-brake apparatus, having a brake cylinder, a reservoir of compressed air, and a pneumatically operated valve for supplying air from said reservoir to said cylinder, a relay valve means for partial release of the vehicle brakes to prevent locking of the vehicle wheels, comprising a piston, a cylinder enclosing said piston and having both ends connected to the head end of said brake cylinder, an opening to atmosphere at one end of said piston-enclosing cylinder, a valve carried by said piston and adapted to seal said opening, a pipe connected to the other end of said piston-enclosing cylinder, and an electromagnetically operated valve normally sealing said pipe, in combination with a device responsive to deceleration of the vehicle and controlling the electromagnet circuit of said pipe-sealing valve to open said pipe when the deceleration of the vehicle reaches the limit of its wheel adhesion, and means for limiting the resultant fall of pressure in said brake cylinder.

3. In pneumatic vehicle brake apparatus, having a brake cylinder, a reservoir of compressed air, and a pneumatically operated valve for supplying air from said reservoir to said cylinder, a deceleration responsive device including a switch responsive to deceleration of the vehicle under brake operation by said brake cylinder, an electric circuit including said switch in series therewith, said switch being closed by said deceleration responsive device only so long as the value of the vehicle deceleration remains below that value which corresponds to the limiting value necessary for the adhesion of the vehicle wheels, a brake release valve, an exhaust valve in said brake release valve, a piston secured to said exhaust valve, a cylinder enclosing said piston and having both ends connected for fluid flow to the head end of said brake cylinder, the connection from the end remote to the exhaust valve being of a smaller size than that connection from the other end, a pressure limiting valve connected to that end of the cylinder remote from the exhaust valve, said limiting valve calibrated for a pressure corresponding to the force required for locking the wheels of the empty vehicle and limiting air exhaustion by said brake release valve, a valve member in the connection between said limiting valve and said brake release valve, said valve member including an electrical actuating means in said electric circuit controlling the exhaust of air from said brake cylinder through one end of said piston enclosing cylinder, said brake release valve controlling exhaust of air from said brake cylinder through the other end of said piston-enclosing cylinder and said pressure limiting valve limiting the exhaust of air from said brake cylinder when the air pressure remaining therein corresponds to the wheel adhesion limit of the unloaded vehicle.

4. In pneumatic vehicle brake apparatus, having a brake cylinder, a reservoir of compressed air, and a pneumatically operated valve for supplying air from said reservoir to said cylinder, a deceleration responsive device including a switch responsive to deceleration of the vehicle under brake operation by said brake cylinder, an electric circuit including said switch in series therewith, said switch being closed by said deceleration responsive device only so long as the value of the vehicle deceleration remains below that value which corresponds to the limiting value necessary for the adhesion of the vehicle wheels, a brake release valve, an exhaust valve in said brake release valve, a piston secured to said exhaust valve, a cylinder enclosing said piston and having both ends connected for fluid flow to the head end of said brake cylinder, the connection from the end remote to the exhaust valve being of a smaller size than that connection from the other end, a pressure limiting valve connected to that end of the cylinder remote from the exhaust valve, said limiting valve calibrated for a pressure corresponding to the force required for locking the wheels of the empty vehicle and limiting air exhaustion by said brake release valve, a valve member in the connection between said limiting valve and said brake release valve, said valve member including an electrical actuating means in said electric circuit controlling the exhaust of air from said brake cylinder through one end of said piston enclosing cylinder, said brake release valve controlling exhaust of air from said brake cylinder through the other end of said piston-enclosing cylinder and said pressure limiting valve limiting the exhaust of air from said brake cylinder through the first mentioned end of said piston-enclosing cylinder when the air pressure remaining therein substantially corresponds to the wheel adhesion limit of the unloaded vehicle, said brake-release valve being thereupon closed by said piston under the action of said remaining air pressure.

References Cited in the file of this patent

UNITED STATES PATENTS

| Number | Name | Date |
|---|---|---|
| 739,918 | Parke | Sept. 29, 1903 |
| 2,052,205 | Baughman | Aug. 25, 1936 |
| 2,115,534 | Nash | Apr. 26, 1938 |
| 2,491,666 | Keller | Dec. 20, 1949 |
| 2,529,985 | Williams | Nov. 14, 1950 |